United States Patent
Kuji et al.

(10) Patent No.: US 7,710,308 B2
(45) Date of Patent: May 4, 2010

(54) MODE S SECONDARY SURVEILLANCE RADAR SYSTEM

(75) Inventors: Yoshinori Kuji, Kawasaki (JP); Yoshirou Aoki, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 425 days.

(21) Appl. No.: 11/855,467

(22) Filed: Sep. 14, 2007

(65) Prior Publication Data

US 2009/0295621 A1 Dec. 3, 2009

(30) Foreign Application Priority Data

Sep. 14, 2006 (JP) ............................ P2006-249797

(51) Int. Cl.
*G01S 13/74* (2006.01)
(52) U.S. Cl. ........................................................ 342/32
(58) Field of Classification Search .................. 342/32, 342/37, 30, 29, 51, 42
See application file for complete search history.

(56) References Cited

U.S. PATENT DOCUMENTS

| | | | |
|---|---|---|---|
| 7,095,360 | B2 | 8/2006 | Kuji et al. |
| 7,391,359 | B2 * | 6/2008 | Ootomo et al. ............... 342/32 |
| 7,408,498 | B2 * | 8/2008 | Kuji et al. ..................... 342/32 |
| 7,471,235 | B2 * | 12/2008 | Ootomo et al. ............... 342/32 |
| 7,501,977 | B2 * | 3/2009 | Ino ............................... 342/32 |
| 7,612,705 | B2 * | 11/2009 | Ino ............................... 342/32 |
| 2006/0181447 | A1 * | 8/2006 | Kuji et al. ..................... 342/32 |
| 2008/0106455 | A1 * | 5/2008 | Ino ............................... 342/32 |
| 2009/0121913 | A1 * | 5/2009 | Ino ............................... 342/37 |
| 2009/0295621 | A1 * | 12/2009 | Kuji et al. ..................... 342/32 |

FOREIGN PATENT DOCUMENTS

| | | |
|---|---|---|
| EP | 1 316 817 A2 | 6/2003 |
| EP | 1 873 554 A1 | 1/2008 |
| GB | 1 178 167 | 1/1970 |
| JP | 63-61978 | 3/1988 |
| JP | 4-332892 | 11/1992 |
| JP | 2005-345283 | 12/2005 |
| JP | 2006-84302 | 3/2006 |
| JP | 2006-113049 | 4/2006 |
| JP | 2006-208026 | 8/2006 |

OTHER PUBLICATIONS

P. Giustiniani, et al., "Improvements in Code Validation Algorithms for Secondary Surveillance Radar", Radar 92, XP006514783, 1992, pp. 143-146.

(Continued)

*Primary Examiner*—Dan Pihulic
(74) *Attorney, Agent, or Firm*—Oblon, Spivak, McClelland, Maier & Neustadt, L.L.P.

(57) ABSTRACT

It is related to a mode S secondary surveillance radar system for carrying out a target (aircraft) surveillance with a high reliability, where a surveillance processor 39 produces a detection report of a acquisition surveillance by a scan of an antenna thereafter by adopting the mode A code information with coinciding code data among mode A code information acquired by scans of a plurality of times. In this way, the efficient utilization of RF channels during the roll-call period can be maintained while improving the reliability of a target detection report.

5 Claims, 5 Drawing Sheets

OTHER PUBLICATIONS

Eurocontrol, "Principles of Mode S Operation and Interrogator Codes", Internet Citation http://www.eurocontrol.int/msa/gallery/content/public/documents/principles/%20of%20mode%20s%20operation%20and%20interrogator%20codes%202.pdf, XP002454133, Mar. 18, 2003, 35 pages.

Michael C. Stevens, "Secondary Surveillance Radar" Section 12.5.1 Surveillance interrogation, IBSN-089006-292-7, pp. 261-262.
Takashi Yoshida, "Revised Radar Techniques", Institute of Electronics, Information and Communication Engineers, Oct. 1, 1996, 6 pages (with English translation).

* cited by examiner

MODE S SECONDARY SURVEILLANCE RADAR SYSTEM

CROSS REFERENCE TO RELATED APPLICATIONS

This application claims benefit of priority under 35 USC §119 to Japanese Patent Application No. 2006-249797 filed on Sep. 14, 2006, the entire contents of which are incorporated by reference herein.

BACKGROUND OF THE INVENTION

1. Field of the Invention

The present invention relates to an improvement of a mode S secondary surveillance radar system capable of detecting aircraft mounted with a mode S transponder or an ATCRBS transponder.

2. Description of the Related Art

Targets (aircrafts) of a secondary surveillance radar system (referred hereafter as SSR) of a ground station include an aircraft mounted with an ATCRBS transponder and an aircraft mounted with a mode S transponder.

The SSR for detecting the ATCRBS transponder and the mode S transponder carries out the surveillance in which a beam dwell time T is divided into a plurality of sweeps (four sweeps, for example), and each sweep is divided into an all-call period and a roll-call period.

For example, as described in Takashi Yoshida (ed.): "Revised Radar Technology", the Institute of Electronic, Information and Communication Engineers, published Oct. 1, 1996, in the all-call period, a mode A/C specialized transaction detecting an aircraft mounted with the ATCRBS transponder and a mode S specialized collective transaction detecting an aircraft mounted with the mode S transponder will be carried out. In the roll-call period, the mode S individual interrogation (roll call) and reply will be carried out by such a schedule that the transaction for respective targets will not overlap, according to a position information (range, azimuth) and a mode S address of targets (aircrafts) obtained from replies of the transponders to the mode S specialized collective interrogation.

Note that the beam dwell time T is a time corresponding to an angle range based on a rotational speed of an antenna that is scanning in a direction of the SSR (azimuth) and a transmission beam width, which is defined uniquely.

Figure 1:
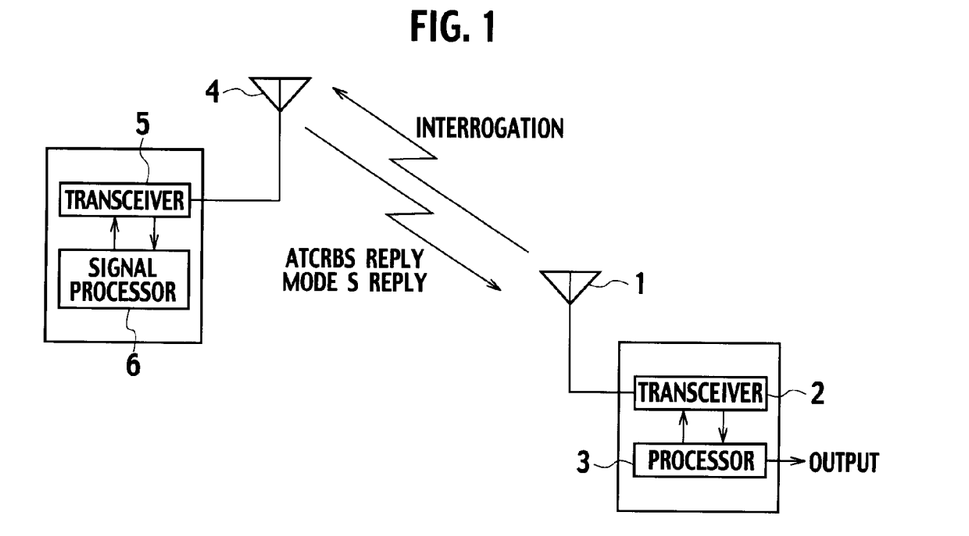
FIG. 1 is a schematic diagram showing a position relationship between a conventional mode S secondary surveillance radar system and a target.
Figure 2:
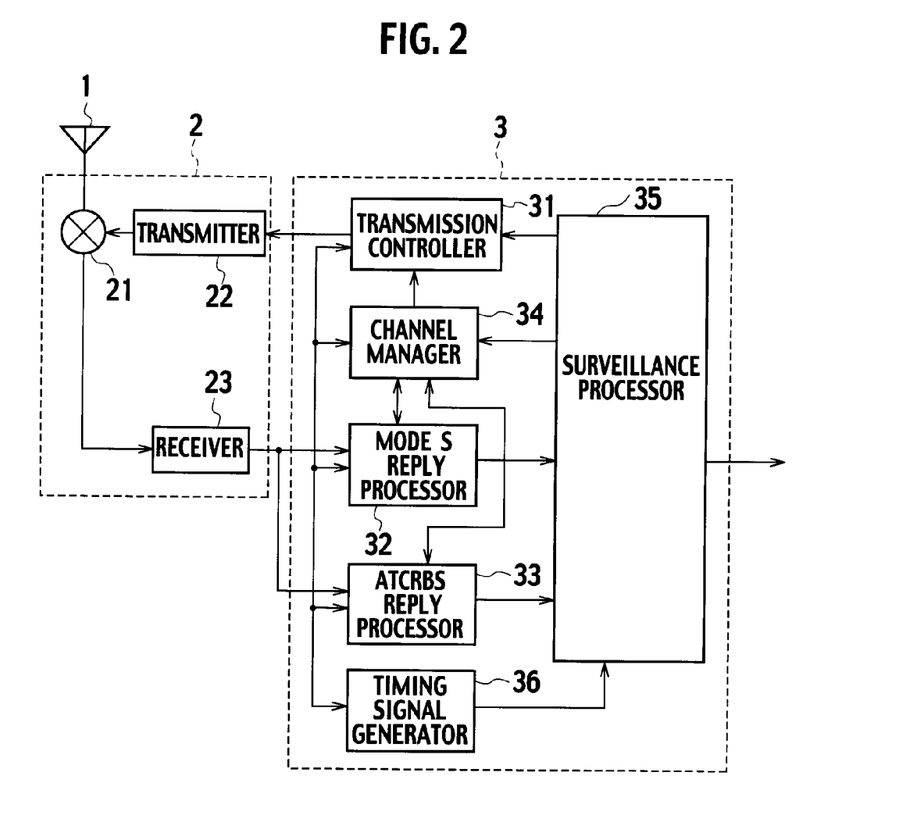
FIG. 2 is a diagram showing a configuration of the mode S secondary surveillance radar system shown in FIG. 1.

FIG. 1 is a schematic diagram showing a configuration of the conventional mode S secondary surveillance radar system and a positional relationship with a target (aircraft) to be detected by the mode S secondary surveillance radar system, and FIG. 2 is a diagram showing a concrete configuration of a processor 3 shown in FIG. 1.

As shown in FIG. 1 and FIG. 2, the mode S secondary surveillance radar system (ground station) on the ground which is a sensor comprises an antenna 1, a transceiver 2 connected to the antenna 1 and formed by a transmission and reception switch 21, a transmitter 22 and a receiver 23, and a processor 3 with a built-in computer connected to the transceiver 2, where the transceiver 2 and the processor 3 constitute an interrogator.

The processor 3 comprises a transmission controller 31 connected to the transmitter 22, a mode S reply processor 32 and an ATCRBS reply processor 33 connected to the receiver 23, a channel manager 34 connected to the mode S reply processor 32 and the transmission controller 31, a surveillance processor 35 connected to the channel manager 34, the transmission controller 31, the mode S reply processor 32 and the ATCRBS reply processor 33, and a timing signal generator 36 for generating and supplying timing signals for scan operations in a direction of the antenna 1 (azimuth), the interrogation transmission, etc., in order to realize an overall control of a system of the processor 3 as a whole.

On the other hand, the transponder of the target (aircraft) comprises an antenna 4 for receiving a interrogation transmitted from the antenna 1 of the ground station (mode S secondary surveillance radar system) and transmitting a reply to that interrogation, i.e. a mode S reply or a mode A/C reply, towards the ground station, a transceiver 5 connected to the antenna 4, and a signal processor 6 connected to the transceiver 5, where the transceiver 5 and the signal processor 6 constitute a transponder.

Note that, an own site ID (identification code) that is necessary in decoding the reply from the target is set in advance in the mode S reply processor 32 of the processor 3, and parameters such as PR (reply probability), a target information obtained by a plurality of scans when a so called target information such as a range (distance), an azimuth and an altitude regarding the target position is obtained over a plurality of scans, and a parameter to become a reference for judging whether it is within a correlated range among scans, i.e. a correlation value are set in advance and stored in the surveillance processor 35.

The channel manager 34 allocates the all-call period TA and the roll-call period TR in the beam dwell time T according to signals from the timing signal generator 36.

The transmission controller 31 generates the mode S specialized collective interrogation and the mode A/C specialized interrogation of the reply probability 1 in the all-call period according to the own site ID and the PR value supplied from the surveillance processor 35, and transmits them towards the target (aircraft) from the antenna 1 through the transmitter 22 and the transmission and reception switch 21.

Then the collective interrogation (of the mode S specialized one plus the mode A/C specialized one) from the ground station is transmitted towards the target mounted with the mode S transponder, and the reply to that transmitted collective interrogation from the transponder is received through the antenna 1 and the transmission and reception switch 21 of the ground station, digitized by the receiver 23 which has amplification, detection and quantization functions, and supplied to the mode S reply processor 32 and the ATCRBS reply processor 33.

The mode S reply processor 32 carries out the preamble detection and the message decoding for the received reply X, estimates a distance to the target and a direction of the target from the position information of the target that can be obtained from the reception timing of the reply X, judges whether the own site ID and the PI (Parity/Interrogator ID) field coincide or not according to a mode S address contained in the reply X, and supplies the reply X for which the own site ID and the PI field coincide to the channel manager 34 and the surveillance processor 35 as a processing target reply. Here, data for which the own site ID and the PI field do not coincide, i.e. non-coincident reply data, will be discarded as not a processing target.

Then, at the surveillance processor 35 which received a supply of the reply of the target which is judged as the processing target at the mode S reply processor 32, a detection report regarding that target is produced, registered and outputted, for those replies for which the mode S all-call coincides among the replies obtained in the same direction and the distance and the direction are within predicted ranges in the previous scan of the antenna 1 and which are within the correlated range that is set in advance. Here, the reply data which are not correlated will be discarded.

Note that, at the surveillance processor 35, if there exists targets for which the mode S address overlaps among targets within the control coverage area controlled by that ground station, in relation to the replies supplied from the mode S reply processor 32, then a case where the air traffic control cannot be carried out properly as one of them is false may occur, so that the acquiring by the all call is carried out again for all the overlapping targets in the case where the mode S address overlaps.

Then, the surveillance processor 35 outputs a command to the channel manager 34, such that the individual interrogation (roll-call) containing a command of a lockout for not responding to the all call will be scheduled, in relation to the target of the reply which is judged as correlated.

The channel manager 34 that received the command carries out the scheduling such that the transaction will not overlap, sequentially from the target (aircraft) for which the distance is farther, for the purpose of the effective utilization of the RF channels.

In the roll-call period, the selective interrogation is scheduled and its reply is received in order to acquire the mode A code information and the altitude information along with the mode S address, for the target acquired by the all call.

For the individual reply of the mode A code information and the altitude information received, the mode S reply processor 32 carries out the preamble detection and the message decoding, sets the mode S address acquired by the earlier all call as a predicted mode S address, and judges whether the predicted mode S address and the mode S address acquired by the roll call coincide or not.

Here, the mode S reply processor 32 supplies the reply for which the mode S address coincides as a processing target to the surveillance processor 35, so that the surveillance processor 35 initially acquisition a target (aircraft) through the correlation processing, and then carries out the production, registration and output of the target detection report according to the acquired mode A code information at the roll-call, and stores code data of that acquired mode A code information into a memory such as RAM. Note here that data of the reply which is not correlated will be discarded as not a processing target.

Note that the mode A code information stored in a memory at the surveillance processor 35 is unique to a flight of the target (aircraft), so that usually it will not be changed while the surveillance and the control of that target are to be continued.

For this reason, in the continued surveillance of the target by the scanning of the antenna 1 after the mode A code information is acquired by the selective interrogation soon after the initial acquiring, the transaction for acquiring the mode A code information will be omitted in order to increase the utilization efficiency of the RF channels.

Consequently, in the production of the target detection report at the scan after the initial acquiring, the detection report for that target is produced by reading out the mode A code information acquired soon after the initial acquiring and stored in a memory whenever necessary.

However, the mode A code information of the target will be acquired again, stored in a memory and utilized by reading it out, when acquired again soon after the coast occurs or when the flight status (FS) of the target changes, for example.

As described above, the mode A code information unique to the flight of the target (aircraft) is usually changed very rarely, so that in the conventional mode S secondary surveillance radar system, the interrogation for acquiring the mode A code information will be omitted in the selective interrogation at the scan of the antenna 1 after the initial acquisition after acquired the mode A code information.

Also as described above, in the conventional mode S secondary surveillance radar system, the mode A code information acquired first that target is used repeatedly in the target detection report production by the scan of the antenna 1 after the initial acquisition, so that if the code data of the mode A code information acquired first contain erroneously converted characters or errors due to some other causes, this erroneous mode A code information would be adopted again, such that there arises a possibility that the air traffic control will not be carried out properly.

BRIEF SUMMARY OF THE INVENTION

It is therefore an object of the present invention to provide a mode S secondary surveillance radar system capable of improving a reliability of the mode A code information to be adopted at a time of producing a target detection report and carrying out the air traffic control more properly, without obstructing the efficient utilization of RF channels during the roll-call period.

The mode S secondary surveillance radar system of the present invention is characterized by having a first mode A code acquisition unit (a transmission controller and a channel manager) for acquiring a mode A code information by acquisition one target by a scan of an antenna; a second mode A code acquisition unit (a transmission controller and a channel manager) for re-acquiring the mode A code information of the one target by a scan of the antenna after acquiring the mode A code information by the first mode A code acquisition unit; and a surveillance processor (a surveillance processor) for detecting the mode A code information with coinciding code data among the mode A code information re-acquired by the second mode A code acquisition unit and the mode A code information acquired by the first mode A code acquisition unit, and producing a detection report of the one target captured thereafter by a scan of the antenna by adopting the mode A code information with coinciding code data.

As described above, the mode S secondary surveillance radar system of the present invention acquires the mode A code information by scans of a plurality of times including a scan of the antenna for making an initial acquisition, and produces a detection report of a acquisition surveillance by a scan of an antenna thereafter by adopting the mode A code information with coinciding code data among mode A code information acquired by scans of a plurality of times, so that the efficient utilization of RF channels during the roll-call period can be maintained while realizing target (aircraft) surveillance with a high reliability.

BRIEF DESCRIPTION OF THE DRAWINGS

FIG. 4A to FIG. 4D are diagrams for explaining a schedule for a scan at a time of an initial acquisition at the system shown in FIG. 3.

FIG. 5A to FIG. 5D are diagrams for explaining a scheme for a scan following an initial acquisition at the system shown in FIG. 3.

FIG. 6A to FIG. 6D are diagrams for explaining a scheme for a scan after acquiring the mode A code information with coinciding code data, by an initial acquisition and subsequent scans.

DETAILED DESCRIPTION OF THE INVENTION

In the following, one embodiment of the mode S secondary surveillance radar system according to the present invention will be described in detail with references to FIG. 3 to FIG. 6D. Note that elements identical to those of the conventional mode S secondary surveillance radar system shown in FIG. 2 will be given the same reference numerals and their detailed description will be omitted.

Figure 3:
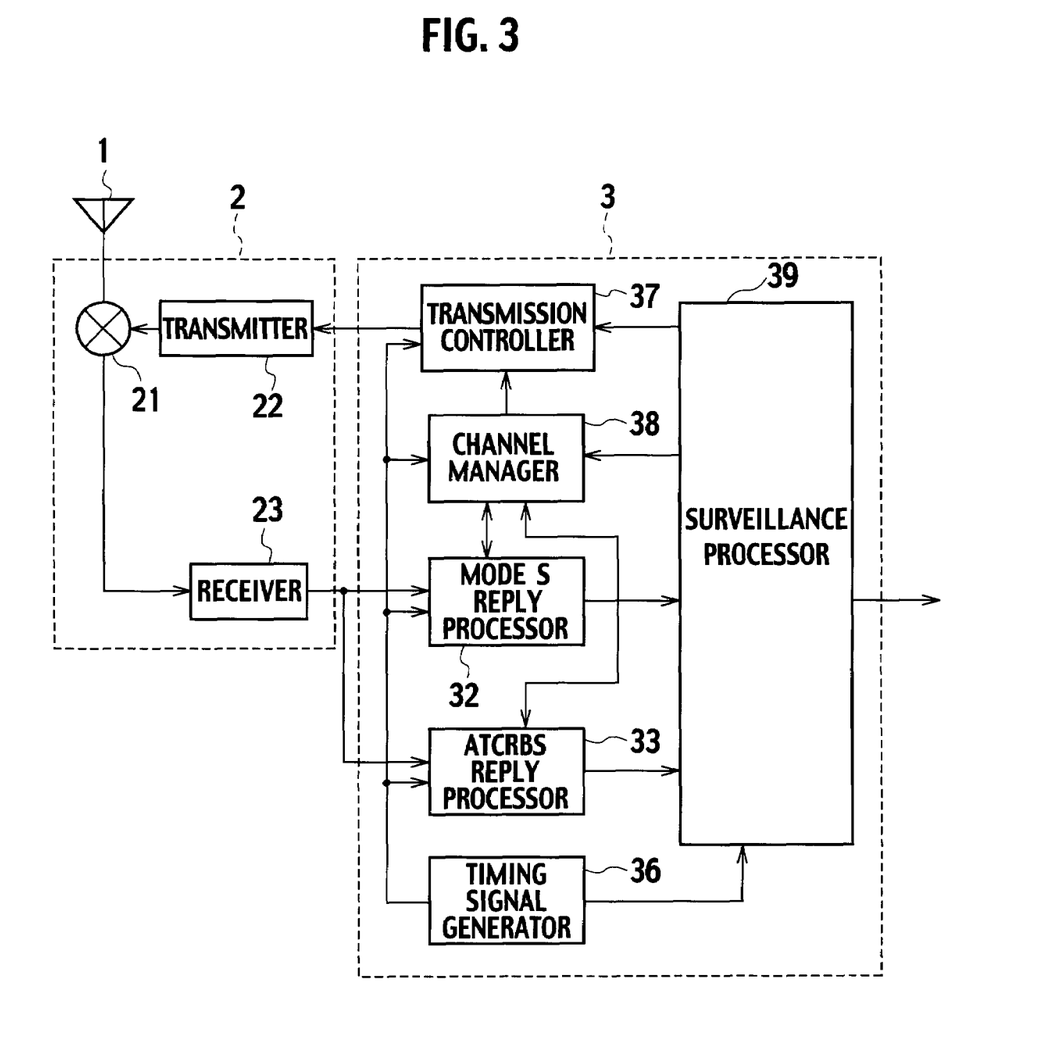
FIG. 3 is a diagram showing a configuration of one embodiment of a mode S secondary surveillance radar system according to the present invention.

FIG. 3 is a diagram showing a configuration of one embodiment of the mode S secondary surveillance radar system according to the present invention.

As shown in FIG. 3, the mode S secondary surveillance radar system of a ground station which is a sensor comprises an antenna 1, a transceiver 2 connected to the antenna 1, and a processor 3 connected to the transceiver 2.

The antenna 1 is connected to a transmitter 22 and a receiver 23 through a transmission and reception switch 21 of the transceiver 2, and the transmitter 22 and the receiver 23 are connected to the processor 3.

The processor 3 comprises a transmission controller 37 connected to the transmitter 22, a mode S reply processor 32 and an ATCRBS reply processor 33 connected to the receiver 23, a channel manager 38 connected to the mode S reply processor 32 and the transmission controller 37, a surveillance processor 39 connected to the channel manager 38, the transmission controller 37, the mode S reply processor 32 and the ATCRBS reply processor 33, and a timing signal generator 36 for carrying out an overall control of a system of the processor 3 as a whole, and generating and supplying timing signals for beam scans in a direction of the antenna 1 (azimuth).

Note that, parameters such as an own site ID and a PR value that is necessary in a processing of a reply from a target (aircraft) are set in advance in the mode S reply processor 32, a correlation value for the purpose of carrying out a correlation processing of a target that is judged as a processing target at the mode S reply processor 32 is set in advance in the surveillance processor 39.

The surveillance processor 39 introduces a target information obtained according to reply data from an ATCRBS transponder and a mode S transponder, introduces a reply to a mode S specialized collective interrogation, judges and detects a presence or absence of the overlapping receiving of an identical mode S address, and produces, registers and outputs a detection report regarding that target when it is judged that the overlapping receiving of the mode S address is absent.

Figure 4A:
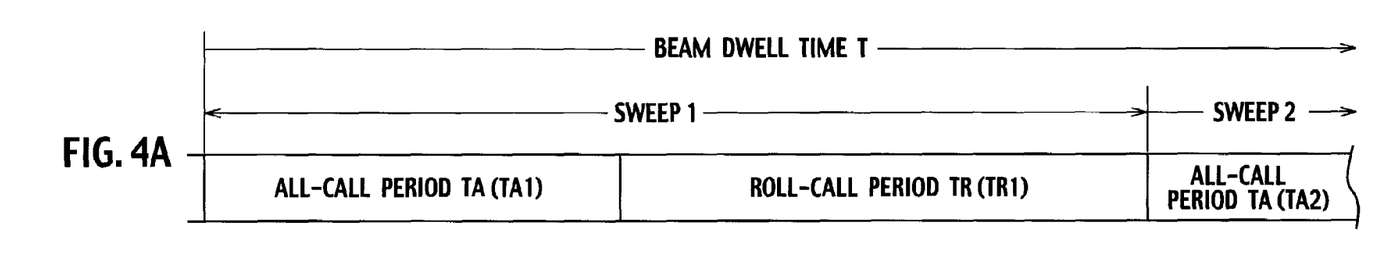
Figure 4B:
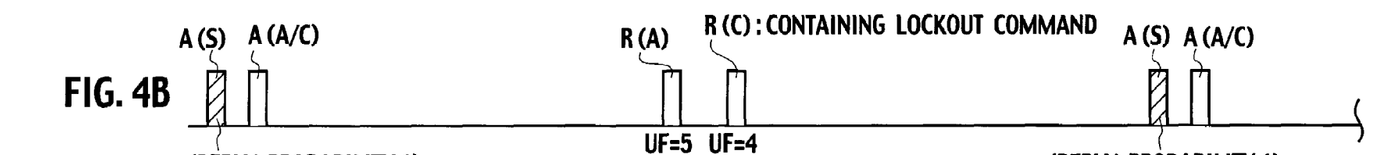
Figure 4C:
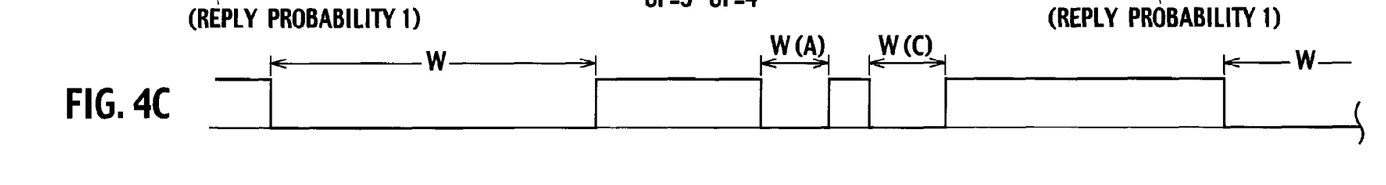
Figure 4D:
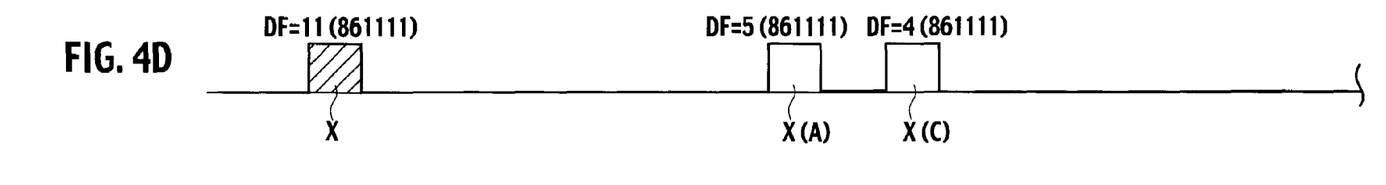
Figure 5A:
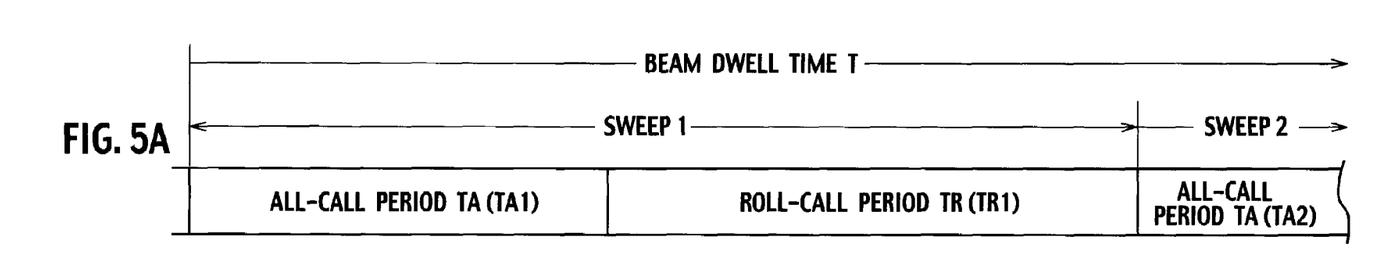
Figure 5B:
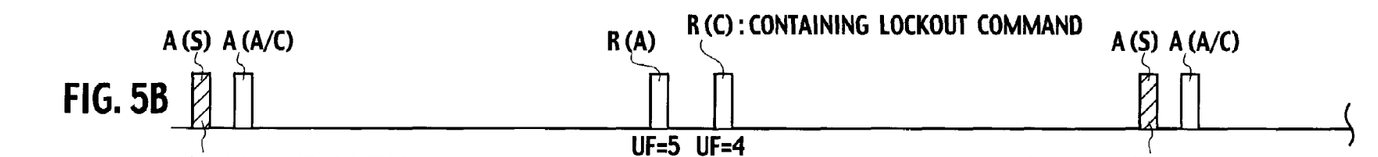
Figure 5C:
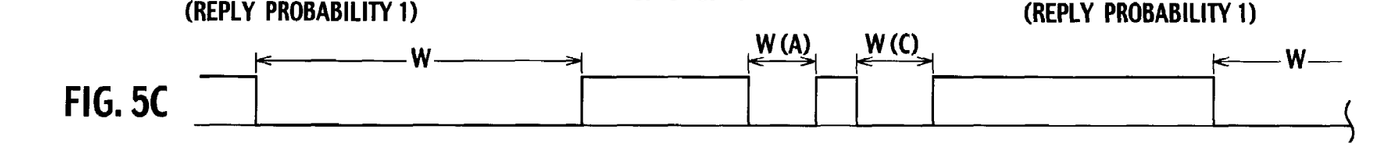
Figure 5D:
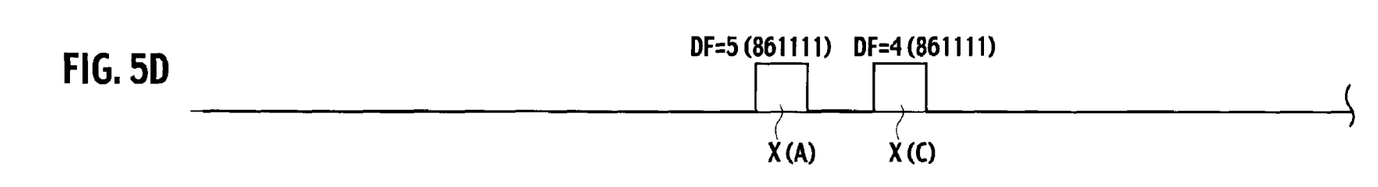
Figure 6A:
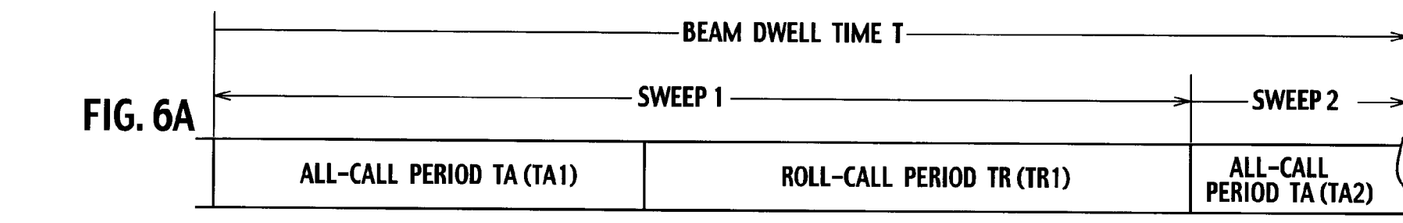
Figure 6B:
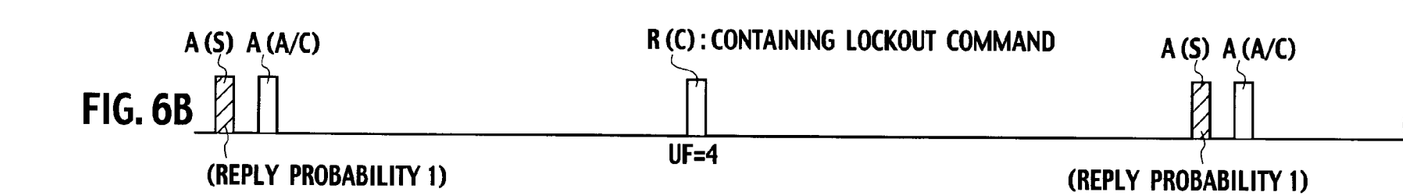
Figure 6C:
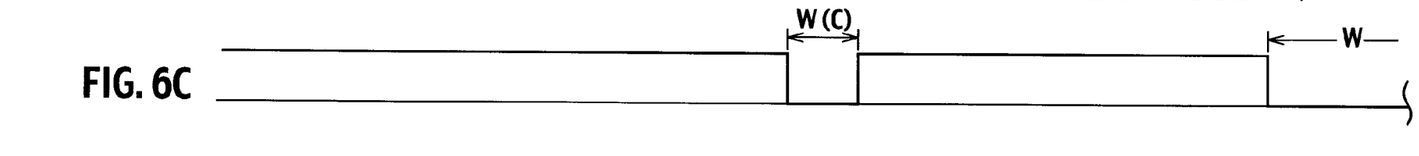
Figure 6D:
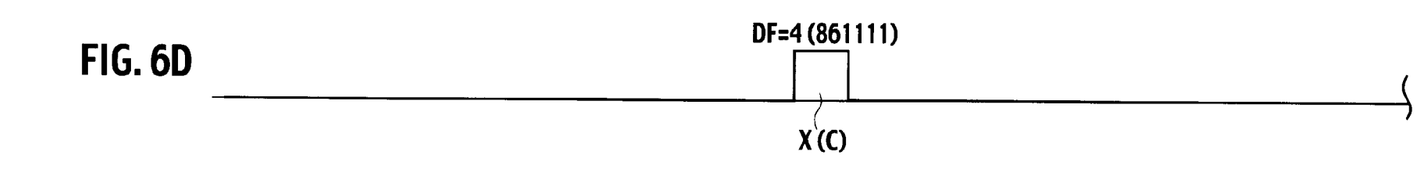

Then, in a configuration of the ground station (mode S secondary surveillance radar system) shown in FIG. 3 according to this embodiment, as shown in FIG. 4B, a collective interrogation (of the mode S only interrogation A(S) plus the mode A/C only interrogation A(A/C)) is transmitted towards the target mounted with the mode S transponder through the antenna 1, and a reply X to that transmitted collective interrogation from the transponder shown in FIG. 4D is supplied to the receiver 23 through the antenna 1 and the transmission and reception switch 21 and through a detection window W shown in FIG. 4C, digitized by the amplified detection and the quantization, and supplied to the mode S reply processor 32 and the ATCRBS reply processor 33.

Note that, as shown in FIG. 4A to FIG. 4D, in this embodiment, the collective interrogation (of the mode S only interrogation A(S) plus the mode A/C only interrogation A(A/C)) is transmitted at a reply probability 1, and the corresponding reply X from the target indicates that it is transmitted by DF=11 with a mode S address (861111).

The mode S reply processor 32 carries out the preamble detection and the message decoding for the received reply X, estimates a distance to the target and a direction of the target from the position information of the target that can be obtained from the reception timing of the reply X, judges whether the own site ID and the PI field coincide or not according to a mode S address contained in the reply X, and supplies the reply X for which the own site ID and the PI field coincide to the channel manager 38 and the surveillance processor 39 as a processing target reply, whereas data for which the own site ID and the PI field do not coincide will be discarded.

At the surveillance processor 39 which received a supply of the reply of the target which is judged as the processing target at the mode S reply processor 32, a detection report regarding that target is produced, registered and outputted, for those replies for which the mode S all call coincides among the replies obtained in the same direction and the distance and the direction are within predicted ranges in the previous scan of the antenna 1 and which are within the correlated range that is set in advance. Here, the reply data which are not correlated will be discarded.

Also, similarly as in the conventional one, the surveillance processor 39 detects whether there exists targets for which the mode S address overlaps among targets within the control coverage area controlled by that ground station or not, in relation to the replies supplied from the mode S reply processor 32, and in a case where targets for which the mode S address overlaps exist, the acquisition by the all call is carried out again for all the overlapping targets.

Then, the surveillance processor 39 outputs a command to the channel manager 38, such that the selective interrogations R(A) and R(C) will be scheduled in order to acquire the mode A code information and the altitude information, as shown in FIG. 4B, in relation to the target of the reply X which is judged as correlated.

The channel manager 38 that received the command sets up corresponding detection windows W(A) and W(C) shown in FIG. 4C, and controls the transmission controller 37 to transmit the selective interrogations R(A) and R(C), so that corresponding replies X(A) and X(C) shown in FIG. 4D are transmitted from the transponder of the target that received them, and supplied to the mode S reply processor 32 and the ATCRBS reply processor 33 through the detection windows X(A) and X(C).

Note that, in FIG. 4A to FIG. 4D, it is indicated that the selective interrogations R(A) and R(C) are transmitted by UF=5 and UF=4, respectively, and the corresponding reply X(A) of the mode A code information and reply X(C) of the altitude information are received by DF=5 and DF=4, respectively.

Then, for the individual replies X(A) and X(C) of the mode A code information and the altitude information received in reply to the selective interrogations R(A) and R(C) in the roll-call period, the mode S reply processor 32 and the ATCRBS reply processor 33 carry out the preamble detection and the message decoding.

Also, the mode S reply processor 32 sets the mode S address acquired by the earlier all call as a predicted mode S address, and judges whether the predicted mode S address and the mode S address acquired by the roll call coincide or not.

Here, the mode S reply processor 32 supplies the reply for which the mode S address coincides as a processing target to the surveillance processor 39, so that the surveillance processor 39 initially acquisition a target (aircraft) through the correlation processing, carries out the production, registration and output of the target detection report, and stores the acquired mode A code information into a memory such as RAM. Note here that data of the reply which is not correlated will be discarded as not a processing target.

Then, as will be described in the following, the mode S secondary surveillance radar system (ground station) of this embodiment carries out the acquisition of the mode A code information at after a time of the initial acquisition of the target by a (first) scan of the antenna 1 also at a time of the acquisition by a (second) scan of the antenna 1 that follows the (first) scan at after a time of the initial acquisition, with respect to the same target, and when the mode A code information comprising the same code data is obtained consecutively twice, the acquisition of the mode A code information thereafter (third and subsequent scans) will be omitted for the first time.

Namely, in relation to the (first) scan at after a time of the initial acquisition by the schedule shown in FIG. 4A to FIG. 4D, the selective interrogation X(C) of the altitude information and the acquisition of the corresponding reply X(C) are carried out in the roll-call period TR by the next (second) scan of the antenna 1 with respect to the captured target, as shown in FIG. 5A to FIG. 5D, and unlike the conventional one, the selective interrogation R(A) of the mode A code information and the acquisition of the corresponding reply X(A) are also repeated similarly.

Note that, for the already initially captured target, a lockout command is issued so as not to respond to the all call TA after the collective interrogation.

In the mode S secondary surveillance radar system according to this embodiment, the surveillance processor 39 acquires the reply X(A) of the mode A code information and the reply X(C) of the altitude information according to the schedule shown in FIG. 5A to FIG. 5D by the (second) scan of the antenna 1, after the initial acquisition according to the schedule shown in FIG. 4A to FIG. 4D, and judges whether the code data of the reply X(A) of the mode A code information acquired here coincide with the code data of the reply X(A) of the mode A code information that are acquired earlier and already stored in the memory or not.

When the code data of the reply X(A) of the mode A code information acquired by the (first) scan of the antenna 1 after the initial acquisition and the code data of the reply X(A) of the mode A code information acquired by the (second) scan of the antenna 1 following the acquisition coincide, the surveillance processor 39 will omit the acquisition of the reply X(A) of the mode A code information by the subsequent scans for the first time, even though the acquisition of the reply X(C) of the altitude information will be continued, as shown in FIG. 6A to FIG. 6D.

Note that, in the above description, if the code data do not coincide between the mode A code information acquired at a time of the initial acquisition (by the first scan) and the mode A code information acquired by the following second scan, they are compared with the code data of the mode A code information acquired by the following third scan, and stored by replacing them with the mode A code information that coincides with either one, and the code data of the replaced mode A code information will be read out and adopted in the production of the target detection report by the scans thereafter (fourth and subsequent).

In this way, according to the mode S secondary surveillance radar system of this embodiment, when the reply X of the mode A code information with the code data coinciding over two times is received by the acquisition of the target following the initial acquisition, the target detection report by the subsequent scans is produced by adopting this coinciding mode A code information for the first time, so that the efficient utilization of RF channels during the roll-call period can be realized while the target (aircraft) surveillance with a high reliability becomes possible.

In the above described embodiment, the acquisition of the mode A code information at a selective interrogation after a time of the initial acquisition has been described, but as mentioned above, the mode A code information is such that, besides the case of after the initial acquisition, the acquisition of the mode A code information becomes necessary again when a coast which misses data of the mode A code information occurs or when acquired again after the flight status of the target is changed, for example, and the acquisition of the mode S interrogation can be omitted in the subsequent scans similarly when the coinciding code data are obtained by the acquisitions of the mode A code information for two times.

Also, at a time of the acquisition of the mode A code information, it is possible to consider the unexpected reception due to the coding error or the like of the code data, but even in such a case, it is required to maintain and improve the reliability of the target detection report at the mode A secondary surveillance radar system.

For this reason, in the mode S secondary surveillance radar system according to the above described embodiment, it has been described that, when the coinciding code data of the mode A code information for the acquired one target are obtained by the consecutive two scans, the surveillance processor 39 adopts this coinciding mode A code information in the production of the detection report by the acquisition of that one target by the subsequent scans, but it is not limited to the consecutive two scans, and it is also possible to adopt the mode A code information for which the code data coincide for three or more scans in the production of the detection report thereafter. It is also possible to adopt the mode A code information for which a greatest number of code data coincide among the acquired mode A code information by the arbitrarily separated scans which are not consecutive in the production of the detection report by the subsequent scans for that one target.

Also, in selecting arbitrary scans in order to acquire the mode A code information to be adopted in the production of the detection report by the subsequent scans, the order of scans to be selected may be set according to a random number table.

Furthermore, in order to improve a reliability of the target detection report to be produced, the acquisition of the mode A code information with coinciding code data for one target described above may be carried out at arbitrary timings or regularly.

Note that, in the description of the above described embodiment, the processor 3 has been described as being formed by hardware, but in practice, each signal processing at the processor 3 will be realized on software of a computer.

What is claimed is:

1. A mode S secondary surveillance radar system, characterized by having
   a first mode A code acquisition unit for acquiring a mode A code information by acquisition one target by a scan of an antenna;
   a second mode A code acquisition unit for re-acquiring the mode A code information of the one target by a scan of the antenna after acquiring the mode A code information by the first mode A code acquisition unit; and
   a surveillance processor for detecting the mode A code information with coinciding code data among the mode A code information re-acquired by the second mode A code acquisition unit and the mode A code information acquired by the first mode A code acquisition unit, and producing a detection report of the one target captured thereafter by a scan of the antenna by adopting the mode A code information with coinciding code data.

2. The mode S secondary surveillance radar system as described in claim 1, characterized in that the second mode A code acquisition unit acquires the mode A code information by a next scan following a scan by which the mode A code information is acquired by the first mode A code acquisition unit.

3. The mode S secondary surveillance radar system as described in claim 1, characterized in that the second mode A code acquisition unit acquires the mode A code information of the one target over a plurality of times, and
   the surveillance processor produces the detection report of the one target captured thereafter by adopting the mode A code information with a greatest number of coinciding code data, among the mode A code information acquired over a plurality of times by the second mode A code acquisition unit and the mode A code information acquired by the first mode A code acquisition unit.

4. The mode S secondary surveillance radar system as described in claim 3, characterized in that the second mode A code acquisition unit acquires the mode A code information of the one target over a plurality of times, by arbitrarily selected scans of the antenna.

5. The mode S secondary surveillance radar system as described in claim 1, characterized in that the first mode A code acquisition unit acquired the mode A code information of the one target by any one scan among a scan at after a time of initial acquisition of a target, a scan at re-acquisition after a coast occurrence, and a scan after a flight status change.

* * * * *